(12) United States Patent
Gardner et al.

(10) Patent No.: US 12,122,873 B2
(45) Date of Patent: *Oct. 22, 2024

(54) PRODUCING SEMI-CRYSTALLINE PULVERULENT POLYCARBONATE AND USE THEREOF IN ADDITIVE MANUFACTURING

(71) Applicant: Jabil Inc., St. Petersburg, FL (US)

(72) Inventors: Thomas Gardner, Chanhassen, MN (US); Travis Hislop, St. Petersburg, FL (US)

(73) Assignee: Jabil Inc., St. Petersburg, FL (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/797,937

(22) PCT Filed: Mar. 3, 2020

(86) PCT No.: PCT/US2020/020811
§ 371 (c)(1),
(2) Date: Aug. 5, 2022

(87) PCT Pub. No.: WO2021/177949
PCT Pub. Date: Sep. 10, 2021

(65) Prior Publication Data
US 2023/0220157 A1    Jul. 13, 2023

Related U.S. Application Data

(63) Continuation of application No. 16/807,764, filed on Mar. 3, 2020, now Pat. No. 11,365,284.

(51) Int. Cl.
| | | |
|---|---|---|
| C08G 64/40 | (2006.01) |
| B29C 64/153 | (2017.01) |
| B29C 64/314 | (2017.01) |
| B33Y 10/00 | (2015.01) |
| B33Y 40/10 | (2020.01) |
| B33Y 70/00 | (2020.01) |
| C08J 3/09 | (2006.01) |
| C08J 3/11 | (2006.01) |
| C08J 3/12 | (2006.01) |
| C08J 3/14 | (2006.01) |
| C09D 5/03 | (2006.01) |
| C09D 169/00 | (2006.01) |
| B29K 69/00 | (2006.01) |

(52) U.S. Cl.
CPC ............ *C08G 64/40* (2013.01); *B29C 64/153* (2017.08); *B29C 64/314* (2017.08); *B33Y 10/00* (2014.12); *B33Y 40/10* (2020.01); *B33Y 70/00* (2014.12); *C08G 64/403* (2013.01); *C08J 3/097* (2013.01); *C08J 3/11* (2013.01); *C08J 3/12* (2013.01); *C08J 3/14* (2013.01); *C09D 5/031* (2013.01); *C09D 169/00* (2013.01); *B29K 2069/00* (2013.01); *B29K 2995/004* (2013.01); *C08G 2140/00* (2013.01); *C08J 2369/00* (2013.01)

(58) Field of Classification Search
USPC ......................................................... 528/370
See application file for complete search history.

(56) References Cited

U.S. PATENT DOCUMENTS

| | | |
|---|---|---|
| 3,214,407 A | 10/1965 | Butterworth |
| 3,267,074 A | 8/1966 | Wood |
| 4,853,462 A | 8/1989 | Hostetler et al. |
| 6,136,948 A | 10/2000 | Dickens, Jr. et al. |
| 6,531,086 B1 | 3/2003 | Larsson |
| 7,708,929 B2 | 5/2010 | Monsheimer et al. |
| 8,066,933 B2 | 11/2011 | Monsheimer et al. |
| 8,840,829 B2 | 9/2014 | Monsheimer et al. |
| 8,865,053 B2 | 10/2014 | Monsheimer et al. |
| 9,567,443 B2 | 2/2017 | Asano et al. |
| 10,259,768 B2 | 4/2019 | Auras et al. |
| 10,500,763 B2 | 12/2019 | Kalyanaraman et al. |
| 2004/0232583 A1 | 11/2004 | Monsheimer et al. |
| 2006/0134419 A1 | 6/2006 | Monsheimer et al. |
| 2007/0182070 A1 | 8/2007 | Monsheimer et al. |
| 2014/0295363 A1 | 10/2014 | Sun et al. |
| 2015/0024205 A1 | 1/2015 | Asano et al. |
| 2017/0028632 A1 | 2/2017 | Cox et al. |
| 2018/0178413 A1 | 6/2018 | Kalyanaraman et al. |
| 2018/0244863 A1 | 8/2018 | Leenders |
| 2020/0140706 A1 | 5/2020 | Pfister et al. |

FOREIGN PATENT DOCUMENTS

| | | |
|---|---|---|
| CN | 107921709 A | 4/2018 |
| DE | 10356193 A1 | 9/2004 |
| EP | 0376653 A2 | 7/1990 |
| EP | 0431924 A2 | 6/1991 |
| EP | 1674497 B1 | 8/2008 |

(Continued)

OTHER PUBLICATIONS

Stephanie Kloos et al., Production of spherical semi-crystalline polycarbonate microparticles for Additive Manufacturing by liquid-liquid phase separation; Powder Technology 335 (2018) 275-284 (Year: 2018) (Year: 2018).*

(Continued)

*Primary Examiner* — Terressa Boykin
(74) *Attorney, Agent, or Firm* — Young Basile Hanlon & MacFarlane, P.C.

(57) ABSTRACT

Ways of preparing a partially crystalline polycarbonate powder are provided that include dissolving an amorphous polycarbonate in a polar aprotic solvent to form a first solution of solubilized polycarbonate at a first temperature. The first solution is then cooled to a second temperature, the second temperature being lower than the first temperature, where a portion of the solubilized polycarbonate precipitates from the first solution to form a second solution including the partially crystalline polycarbonate powder. Certain partially crystalline polycarbonate powders resulting from such methods are particularly useful in additive manufacturing processes, including powder bed fusion processes.

19 Claims, 6 Drawing Sheets

(56) References Cited

FOREIGN PATENT DOCUMENTS

| | | |
|---|---|---|
| EP | 2556115 B1 | 12/2013 |
| GB | 2226318 A | 6/1990 |
| GB | 2226319 A | 6/1990 |
| JP | H02215838 A | 8/1990 |
| JP | 2017095650 A | 6/2017 |
| KR | 20180021091 A | 2/2018 |
| WO | 199606881 A2 | 3/1996 |
| WO | 200138061 A1 | 5/2001 |
| WO | 2013175448 A1 | 11/2013 |
| WO | 2014072923 A1 | 5/2014 |
| WO | 2015157148 A1 | 10/2015 |
| WO | 2017033146 A1 | 3/2017 |
| WO | 2018071578 A1 | 4/2018 |
| WO | 2018197577 A1 | 11/2018 |
| WO | 2021055267 A1 | 3/2021 |

OTHER PUBLICATIONS

English translation of First Office Action in co-pending Applicvation No. JP 2022-544302 issued Feb. 22, 2023.

Kloos, Stepanie et al., "Production of spherical semi-crystalline polycarbonate microparticles for Additive Manufacturing by liquid-liquid phase separation." Powder Technology 335 (2018) 275-284.

Solvent-Induced Crystallization in Poly(ethylene terephthalate) during Mass Transport: Mechanism and Boundary Condition; Hao Ouyang, Wen-Hao Lee, Wen Ouyang, Sham-Tsong Shiue, and Tzong-Ming Wu; Macromolecules 2004 37 (20), 7719-7723; DOI: 10.1021/ma0400416; Publication Date: Sep. 3, 2004; https://pubs.acs.org/doi/abs/10.1021/ma0400416.

Three Stages of Crystallization in Poly(ethylene terephthalate) during Mass Transport: Hao Ouyang, Wen-Hao Lee, and Ming-Chih Shih; Macromolecules 2002, 35, 22, 8428-8428-8432 (article); Publication Date (Web): Sep. 28, 2002; DOI: 10.1021/ma020851m; https://pubs.acs.org/doi/10.1021/ma020851m.

Molecular Mechanism of Solvent-Induced Crystallization of Syndiotactic Polystyrene Glass. 1. Time-Resolved Measurements of Infrared/Raman Spectra and X-ray Diffractioohji Tashiro, Yoko Ueno, Akiko Yoshioka, and Masamichi Kobayashi; Cite this: Macromolecules 2001, 34, 2, 310-315; Publication Date: Dec. 14, 2000.

International Search Report and Written Opinion in co-pending International Application No. PCT/US2020/020811 mailed May 4, 2020 (8 pages).

International Preliminary Report on Patentability in co-pending International Application No. PCT/US2020/020811 mailed Nov. 10, 2021 (19 pages).

* cited by examiner

PRODUCING SEMI-CRYSTALLINE PULVERULENT POLYCARBONATE AND USE THEREOF IN ADDITIVE MANUFACTURING

CROSS-REFERENCE TO RELATED APPLICATIONS

This application is a National Stage 371 entry of PCT/US2020/020811 filed on Mar. 3, 2020, published as WO2021/177949A1, which claims priority to U.S. patent application Ser. No. 16/807,764 filed on Mar. 3, 2020, each of which are incorporated herein by reference in their entirety for all purposes.

FIELD

The present technology relates to precipitating a pulverulent polycarbonate in a solvent, allowing the pulverulent polycarbonate to form crystallites, and employing the precipitated pulverulent polycarbonate in a powder-based additive manufacturing process.

BACKGROUND OF THE INVENTION

This section provides background information related to the present disclosure which is not necessarily prior art.

Various additive manufacturing processes, also known as three-dimensional (3D) printing processes, can be used to form three-dimensional objects by fusing certain materials at particular locations and/or in layers. Material can be joined or solidified under computer control, for example working from a computer-aided design (CAD) model, to create a three-dimensional object, with material being added together, such as liquid molecules or powder grains being fused together, typically layer-by-layer. Various types of additive manufacturing include binder jetting, directed energy deposition, material extrusion, material jetting, powder bed fusion, sheet lamination, and vat photopolymerization.

Certain additive manufacturing methods can be conducted using thermoplastic polymers (e.g., polycarbonate), which include material extrusion, fused deposition modeling, and powder bed fusion. Powder bed fusion, in general, involves selective fusing of materials in a powder bed. The method can fuse parts of a layer of powder material, move upward in a working area, add another layer of powder material, and repeat the process until an object is built up therefrom. The powder bed fusion process can use unfused media to support overhangs and thin walls in the object being produced, which can reduce the need for temporary auxiliary supports in forming the object. In selective heat sintering, a thermal printhead can apply heat to layers of powdered thermoplastic; when a layer is finished, the powder bed moves down, and an automated roller adds a new layer of material which is sintered to form the next cross-section of the object. Selective laser sintering is another powder bed fusion process that can use one or more lasers to fuse powdered thermoplastic polymers into the desired three-dimensional object.

Materials for powder bed fusion processes preferably have a uniform shape, size, and composition. The preparation of such powders from thermoplastic polymers on an economical and large scale is not straightforward. What is more, it can be difficult to use amorphous polycarbonates, particularly in powder bed fusing processes such as selective laser sintering, because such polycarbonates may not exhibit a sharp melting point. This property can result in dissipation of the applied thermal energy source (e.g., a laser beam) into the regions surrounding where the energy source contacts or strikes the powder bed. This undesired dissipation of thermal energy can result in unstable processing as well as poor feature resolution in the intended three-dimensional object being produced.

Certain preparations of polycarbonate powders for powder bed fusion are known. For example, U.S. Pub. No. 2017/9567443 B2, Japanese Pat. No. 2017/095650 A, and U.S. Pub. No. 2018/0244863 A1 each discuss methods that include dissolving polycarbonate in a suitable organic solvent, addition of a dispersing polymer to promote and sustain emulsion formation, and addition of a solvent that is miscible with the organic solvent but that is not a solvent for the polycarbonate, resulting in emulsion formation and subsequent precipitation of polycarbonate powder. In addition, WO 2018/071578 A1 and U.S. Pub. No. 2018/0178413 A1 describe the use of solvents to induce crystalline domain formation in pre-formed powder particles produced from grinding methods.

Such methods of preparing crystalline polycarbonate powders for use in powder bed fusion processes still present several technical issues. In particular, prior methods of processing polycarbonate powder into a form suitable for use in certain methods, such as selective laser sintering (SLS), multi jet fusion (MJF), high speed sintering (HSS), and electrophotographic 3D-printing applications, can require the use of mixed solvents and dispersants. There is accordingly a need to provide a single solvent method, facilitating solvent recovery and reuse, that can form polycarbonate powder having optimal crystallinity and optimal particle size distribution from amorphous polymer, where the crystalline polycarbonate powder results in improved powder bed fusion performance.

SUMMARY OF THE INVENTION

The present technology includes processes, compositions, and articles of manufacture that relate to preparation of a partially crystalline polycarbonate powder and use thereof in additive manufacturing processes, including powder bed fusion processes.

Methods of preparing a partially crystalline polycarbonate powder are provided that include dissolving an amorphous polycarbonate in a polar aprotic solvent to form a first solution of solubilized polycarbonate at a first temperature. The first solution is then cooled to a second temperature, where the second temperature is lower than the first temperature. A portion of the solubilized polycarbonate precipitates from the first solution to form a second solution including the partially crystalline polycarbonate powder. Powder compositions for use in powder bed fusion processes are provided that include a partially crystalline polycarbonate powder prepared by such methods. Objects can be prepared by using such partially crystalline polycarbonate powders in a powder bed fusion process to form the object.

The disclosed exemplary apparatuses, systems, and methods provide powder polycarbonate having a suitable operating window for use in SLS, MJF, HSS, and electrophotography 3D-printing applications. An embodiment of the disclosure may provide a precipitated pulverulent polycarbonate formed through precipitating the polycarbonate in a solvent, allowing the polymer to form crystallites, and then employing the precipitated pulverulent polycarbonate in a powder-based 3D-printing process.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

Figure 1:
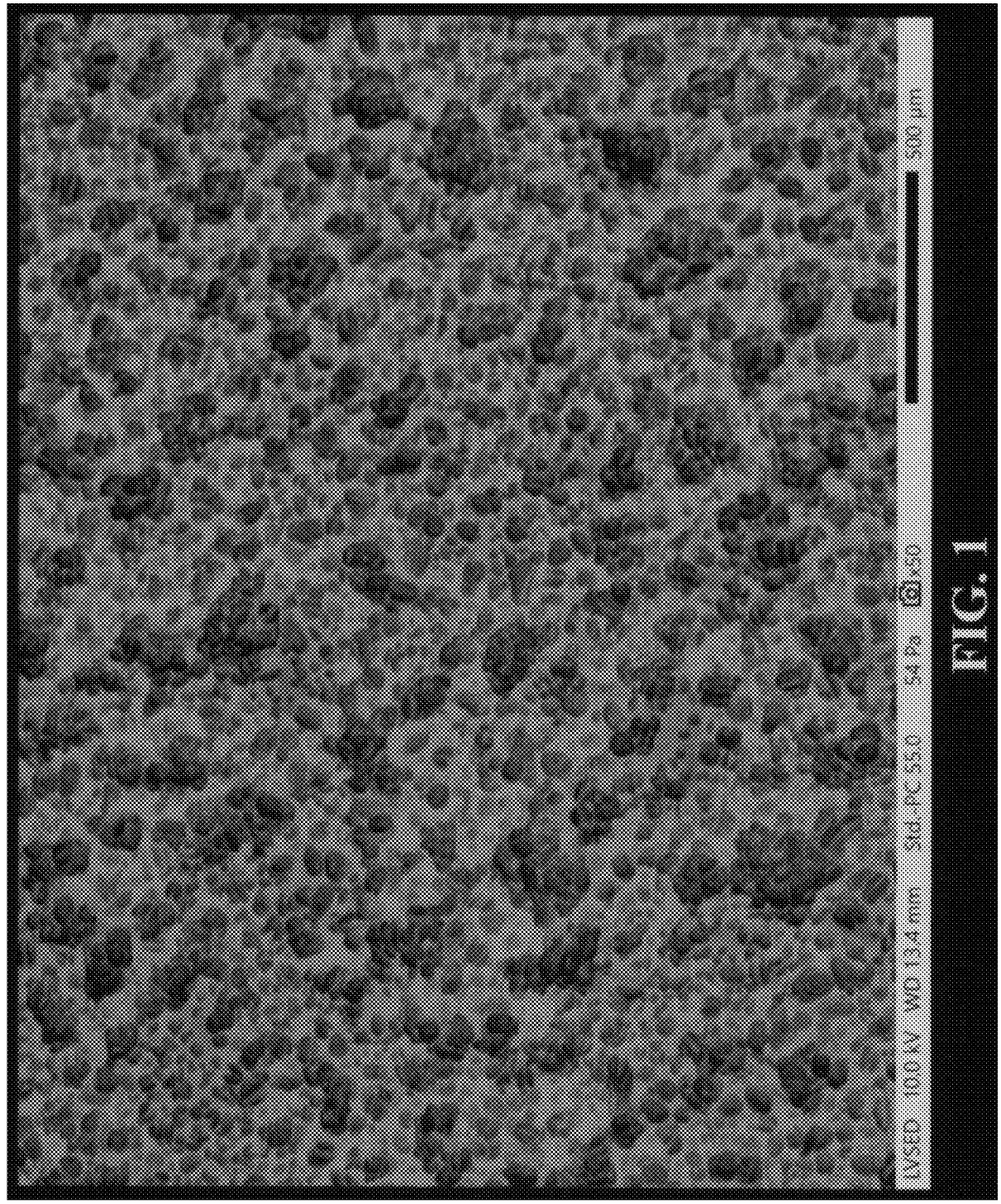
FIG. 1: Low vacuum secondary electron detector (LVSED) scanning electron micrograph (SEM) of pulverulent polycarbonate as produced by Example 1, magnification 50×.
Figure 2:
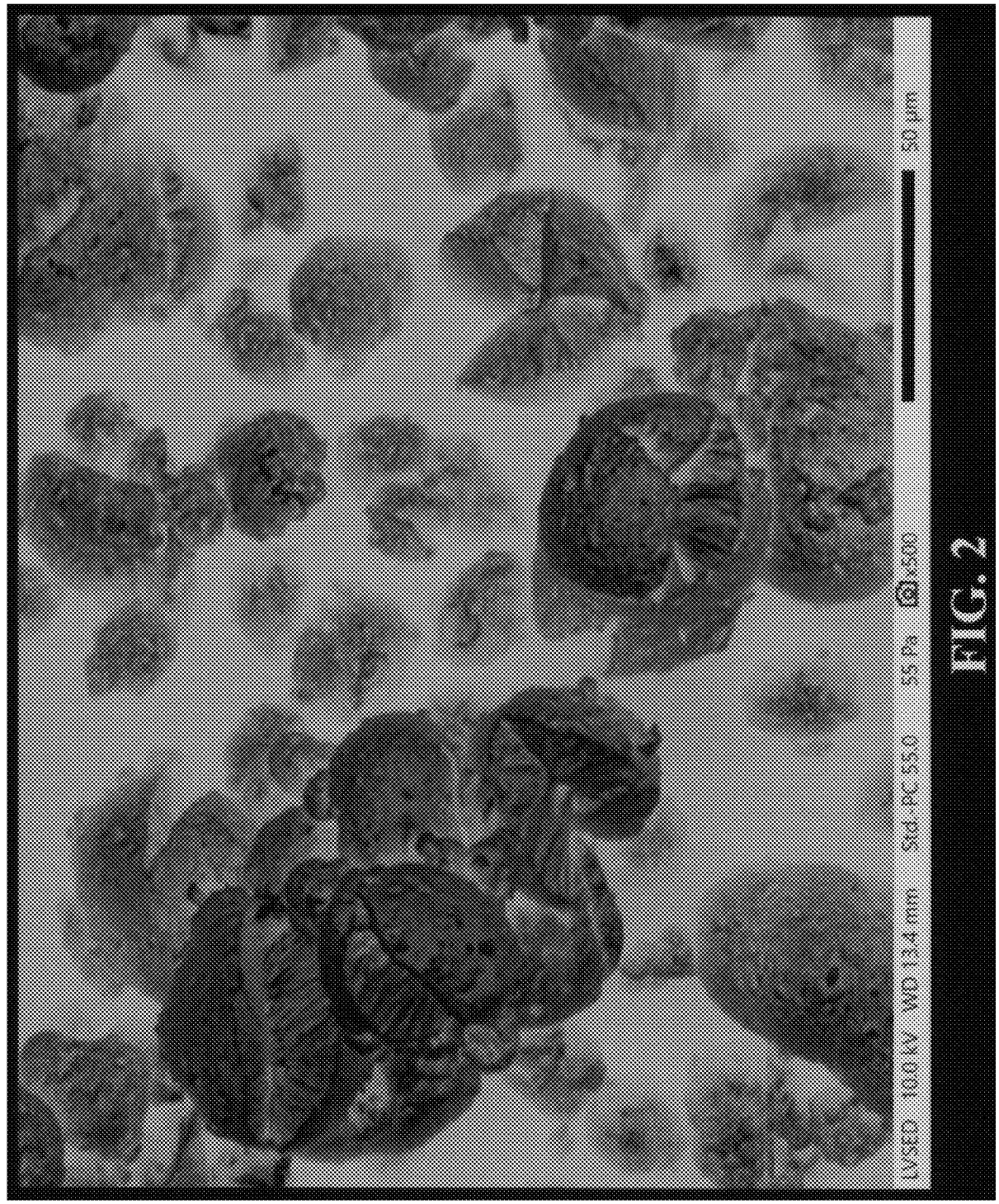
FIG. 2: Low vacuum secondary electron detector (LVSED) scanning electron micrograph (SEM) of pulverulent polycarbonate as produced by Example 1, magnification 500×.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology provides ways to make and use partially crystalline polycarbonate powder, including partially crystalline polycarbonate powder having suitable characteristics for use in selective laser sintering (SLS), multi jet fusion (MJF), high speed sintering (HSS), and electrophotographic 3D-printing. Embodiments provide a precipitated pulverulent polycarbonate formed through precipitating the polycarbonate in a solvent, allowing the polymer to form crystallites, and then employing the precipitated pulverulent polycarbonate in a powder-based 3D-printing process. The present partially crystalline polycarbonate powder exhibits optimized characteristics for powder bed fusion processes, including optimized particle size, shape, distribution, and crystallinity, while at the same time using a dispersant-free single-solvent process in manufacture thereof.

Methods of preparing a partially crystalline polycarbonate powder can include dissolving an amorphous polycarbonate in dimethyl sulfoxide (DMSO) solvent to form a solution at elevated temperature; cooling the solution to room temperature to form a pulverulent, partially crystalline polycarbonate precipitate having a D90 particle size of less than 150 µm; an average particle diameter of less than or equal to 100 µm, or an average particle diameter of between 0 to 100 µm; and at least 20% crystallinity, or at least 25% crystallinity, or 25 to 35% crystallinity. Prior methods of processing polycarbonate powder into a form suitable for use in an additive manufacturing process, such as selective laser sintering (SLS), multi jet fusion (MJF), high speed sintering (HSS), and electrophotographic 3D-printing applications, that require the use of mixed solvents and dispersants; whereas, the processes described herein can employ a single solvent method, facilitating solvent recovery and reuse. The methods also yield a product where the particles can exhibit a certain size (about 30 micrometers to about 40 micrometers in average diameter), low dispersity, spheroidal shape, and crystalline character suitable for the above-mentioned printing processes in comparison to the results of aforementioned processes.

In certain embodiments, methods of preparing a partially crystalline polycarbonate powder are provided. Such methods can include dissolving an amorphous polycarbonate in a polar aprotic solvent to form a first solution of solubilized polycarbonate at a first temperature. The first solution is then cooled to a second temperature, the second temperature being lower than the first temperature, where a portion of the solubilized polycarbonate precipitates from the first solution to form a second solution including the partially crystalline polycarbonate powder. The precipitated partially crystalline polycarbonate powder can be separated from a remainder of the second solution. The separated partially crystalline polycarbonate powder can also be dried. It is possible to repeat the dissolving step using the remainder of the second solution as the polar aprotic solvent, and further repeat the cooling step to form the second solution including another partially crystalline polycarbonate powder. In certain embodiments, the polar aprotic solvent can include dimethyl sulfoxide. In other embodiments, the polar aprotic solvent can consists essentially of dimethyl sulfoxide. And in still further embodiments, the polar aprotic solvent can consist of dimethyl sulfoxide.

Various temperatures can be employed in methods of preparing the partially crystalline polycarbonate powder. The dissolving step can include heating the amorphous polycarbonate in the polar aprotic solvent to form the first solution of solubilized polycarbonate at the first temperature, where the first temperature is greater than room temperature. The cooling step can include cooling the first solution to the second temperature, where the second temperature is room temperature. In certain embodiments, the first solution can be supersaturated with amorphous polycarbonate at the first temperature. For example, the first solution can be supersaturated with amorphous polycarbonate at the first temperature in comparison to the solubility limit of amorphous polycarbonate in the first solution at the second temperature.

Various embodiments of the partially crystalline polycarbonate powder prepared according to the present methods can exhibit the following physical characteristics. The partially crystalline polycarbonate powder can have a D90 particle size of less than about 150 micrometers; i.e., 90 vol % of the particles in the total distribution of the partially crystalline polycarbonate powder have a particle diameter of 150 micrometers or smaller. In certain embodiments, the partially crystalline polycarbonate powder can have an average particle diameter of less than about 100 micrometers. The partially crystalline polycarbonate powder can also have an average particle diameter from about 1 micrometer to about 100 micrometers. Particular embodiments include where the partially crystalline polycarbonate powder has an average particle diameter from about 30 micrometers to about 40 micrometers. The partially crystalline polycarbonate powder can be in the form of spheroidal particles. Various crystallinity values are possible, where the partially crystalline polycarbonate powder can have at least about 20% crystallinity, at least about 25% crystallinity, and in certain embodiments the partially crystalline polycarbonate powder can have a crystallinity between about 25% and about 35%.

In certain embodiments, powder compositions for use in a powder bed fusion process are provided, where such powder compositions include a partially crystalline polycarbonate powder prepared according to the methods provided herein. For example, a powder composition for use in a powder bed fusion process can include a partially crystalline polycarbonate powder having a D90 particle size of less than about 150 micrometers, an average particle diameter from about 30 micrometers to about 40 micrometers, and a crystallinity between about 25% and about 35%. Such powder compositions can include mixtures of partially crystalline polycarbonate powders having different physical characteristics as well as additives and other components as described herein.

In certain embodiments, methods of preparing an object are provided. Such methods can include preparing a partially crystalline polycarbonate powder by a method that includes dissolving an amorphous polycarbonate in a polar aprotic solvent to form a first solution of solubilized polycarbonate at a first temperature. The first solution can then be cooled to a second temperature, the second temperature being lower than the first temperature, wherein a portion of the solubilized polycarbonate precipitates from the first solution to form a second solution including the partially crystalline polycarbonate powder. The partially crystalline polycarbonate powder is then used in a powder bed fusion process to form the object. Certain methods of preparing an object include providing a partially crystalline polycarbonate powder having a D90 particle size of less than about 150 micrometers, an average particle diameter from about 30 micrometers to about 40 micrometers, and a crystallinity between about 25% and about 35%. The partially crystalline polycarbonate powder is then used in a powder bed fusion process to form the object.

In certain embodiments, one or more objects prepared by an additive manufacturing process are provided. Such methods can include providing a partially crystalline polycarbonate powder prepared according to one or more of the methods described herein. The partially crystalline polycarbonate powder is then used in a powder bed fusion process to form the one or more objects.

In certain embodiments, the present technology includes methods of converting an amorphous polycarbonate to a partially crystalline polycarbonate powder. Such methods can include dissolving the amorphous polycarbonate in a polar aprotic solvent such as dimethyl sulfoxide (DMSO) to form a solution at an elevated temperature above room temperature, subsequently cooling the solution to room temperature to form a partially crystalline polycarbonate precipitate, and recovering the partially crystalline polycarbonate precipitate as a substantially uniform polycarbonate powder from the solvent. The resulting partially crystalline polycarbonate powder can have good crystallinity, particle size distribution, and flowability. In particular, the partially crystalline polycarbonate powder can include: a D90 particle size of less than 150 μm; an average particle diameter of less than or equal to 100 μm or an average particle diameter of between 0 to 100 μm; and at least 20% crystallinity, at least 25% crystallinity, or 25 to 35% crystallinity. As the majority of the particles of the partially crystalline polycarbonate powder can have a size of less than 150 micrometers (μm), the partially crystalline polycarbonate powder can therefore be effectively used in powder bed fusion processes, e.g., selective laser sintering processes, to produce layers having a thickness of 100 μm to 150 μm.

In certain embodiments, the present technology includes methods for powder bed fusing a powder composition including the partially crystalline polycarbonate powder to form a three-dimensional object. Due to the good flowability of the partially crystalline polycarbonate powder, a smooth and dense powder bed can be formed allowing for optimum precision and density of the sintered object. The partially crystalline nature of the polycarbonate material further allows for ease of processing, where the use of crystalline polycarbonate permits the use of reduced melting energy versus the melting of corresponding amorphous polymeric materials.

The terms "amorphous" and "crystalline" as used herein refer their usual meanings in the polymer art, with respect to alignment of polymer molecular chains. For example, in an amorphous polymer (e.g., polycarbonate) the molecules can be oriented randomly and can be intertwined, much like cooked spaghetti noodles, and the polymer can have a glasslike, transparent appearance. In crystalline polymers, the polymer molecules can be aligned together in ordered regions, much like uncooked spaghetti noodles. In the polymer art, some types of crystalline polymers are sometimes referred to as "semi-crystalline polymers." The term "crystalline" as used herein refers to both crystalline and semi-crystalline polymers. The term "partially crystalline polycarbonate" as used herein means a portion of the polycarbonate polymer is in crystalline form. The term "percent crystallinity" or "% crystallinity" as used herein, refers to the portion of the amorphous polymer that has been converted to the partially crystalline form. The percentage is based upon the total weight of the partially crystalline polymer.

The particle size of the partially crystalline polymer can affect its use in additive manufacturing processes. As used herein, D50 (as known as "average particle diameter") refers to the particle diameter of the powder where 50 vol. % of the particles in the total distribution of the referenced sample have the noted particle diameter or smaller. Similarly, D10 refers to the particle diameter of the powder where 10 vol. % of the particles in the total distribution of the referenced sample have the noted particle diameter or smaller; D90 refers to the particle diameter of the powder where 90 vol. % of the particles in the total distribution of the referenced sample have the noted particle diameter or smaller; and D95 refers to the particle diameter of the powder where 95 vol. % of the particles in the total distribution of the referenced sample have the noted particle diameter or smaller. Particle sizes can be measured by any suitable methods known in the art to measure particle size by diameter. In some embodiments, the particle size is determined by laser diffraction as is known in the art. For example, particle size can be determined using a laser diffractometer such as the Microtrac S3500. The partially crystalline polycarbonate powder provided herein can have a D90 particle size of less than 150 μm.

The term "high shear mixing conditions" refers to methods of agitating the components in a mixture (e.g., liquid mixture) under conditions in which high shear forces are generated. As is known in the art, a high shear mixer creates patterns of flow and turbulence, generally using an impeller that rotates inside a stator. Once the impeller has drawn mixture in, it subjects the mixture sudden changes of direction and acceleration, often approaching 90 degrees, such that the mixture contacts the wall of the stator with centrifugal force, or is forced through the holes in the stator at great pressure and speed, in a final disintegrating change of direction and acceleration. In certain embodiments of high shear mixing conditions, the high shear mixing comprises mixing at speeds of 2,000 rotations per minute (rpm) to 20,000 rpm, specifically, 3,000 rpm to 15,000 rpm, more specifically 4,000 rpm to 10,000 rpm. High shear mixing can be achieved with any commercially available high shear mixers. For example, a high shear mixer such as a Silverson L5M homogenizer can be used.

The term "powder bed fusing" or "powder bed fusion" is used herein to mean processes wherein the polycarbonate is selectively sintered or melted and fused, layer-by-layer to provide a 3-D object. Sintering can result in objects having a density of less than about 90% of the density of the solid powder composition, whereas melting can provide objects having a density of 90%-100% of the solid powder composition. Use of crystalline polycarbonate as provided herein can facilitate melting such that resulting densities can approach densities achieved by injection molding methods.

Powder bed fusing or powder bed fusion further includes all laser sintering and all selective laser sintering processes as well as other powder bed fusing technologies as defined by ASTM F2792-12a. For example, sintering of the powder composition can be accomplished via application of electromagnetic radiation other than that produced by a laser, with the selectivity of the sintering achieved, for example, through selective application of inhibitors, absorbers, susceptors, or the electromagnetic radiation (e.g., through use of masks or directed laser beams). Any other suitable source of electromagnetic radiation can be used, including, for example, infrared radiation sources, microwave generators, lasers, radiative heaters, lamps, or a combination thereof. In certain embodiments, selective mask sintering ("SMS") techniques can be used to produce three-dimensional objects. For further discussion of SMS processes, see for example U.S. Pat. No. 6,531,086, which describes an SMS machine in which a shielding mask is used to selectively block infrared radiation, resulting in the selective irradiation of a portion of a powder layer. If using an SMS process to produce objects from powder compositions of the present technology, it can be desirable to include one or more materials in the powder composition that enhance the infrared absorption properties of the powder composition. For example, the powder composition can include one or more heat absorbers or dark-colored materials (e.g., carbon black, carbon nanotubes, or carbon fibers).

Also included herein are all three-dimensional objects made by powder bed fusing compositions including the partially crystalline polycarbonate powder described herein. After a layer-by-layer manufacture of an object, the object can exhibit excellent resolution, durability, and strength. Such objects can include various articles of manufacture that have a wide variety of uses, including uses as prototypes, as end products, as well as molds for end products.

In particular, powder bed fused (e.g., laser sintered) objects can be produced from compositions including the partially crystalline polycarbonate powder using any suitable powder bed fusing processes including laser sintering processes. These objects can include a plurality of overlying and adherent sintered layers that include a polymeric matrix which, in some embodiments, can have reinforcement particles dispersed throughout the polymeric matrix. Laser sintering processes are known, and are based on the selective sintering of polymer particles, where layers of polymer particles are briefly exposed to laser light and the polymer particles exposed to the laser light are thus bonded to one another. Successive sintering of layers of polymer particles produces three-dimensional objects. Details concerning the selective laser sintering process are found, by way of example, in the specifications of U.S. Pat. No. 6,136,948 and WO 96/06881. However, the partially crystalline polycarbonate powder described herein can also be used in other rapid prototyping or rapid manufacturing processing of the prior art, in particular in those described above. For example, the partially crystalline polycarbonate powder can in particular be used for producing moldings from powders via the SLS (selective laser sintering) process, as described in U.S. Pat. No. 6,136,948 or WO 96/06881, via the SIB process (selective inhibition of bonding of powder), as described in WO 01/38061, via 3D printing, as described in EP 0 431 924, or via a microwave process, as described in DE 103 11 438.

In certain embodiments, the present technology includes forming a plurality of layers in a preset pattern by an additive manufacturing process. "Plurality" as used in the context of additive manufacturing can include 5 or more layers, or 20 or more layers. The maximum number of layers can vary greatly, determined, for example, by considerations such as the size of the object being manufactured, the technique used, the capacities and capabilities of the equipment used, and the level of detail desired in the final object. For example, 5 to 100,000 layers can be formed, or 20 to 50,000 layers can be formed, or 50 to 50,000 layers can be formed.

As used herein, "layer" is a term of convenience that includes any shape, regular or irregular, having at least a predetermined thickness. In certain embodiments, the size and configuration two dimensions are predetermined, and in certain embodiments, the size and shape of all three-dimensions of the layer are predetermined. The thickness of each layer can vary widely depending on the additive manufacturing method. In certain embodiments the thickness of each layer as formed can differ from a previous or subsequent layer. In certain embodiments, the thickness of each layer can be the same. In certain embodiments the thickness of each layer as formed can be from 0.5 millimeters (mm) to 5 mm.

An object can be formed from a preset pattern, which can be determined from a three-dimensional digital representation of the desired object as is known in the art and as described herein. Material can be joined or solidified under computer control, for example, working from a computer-aided design (CAD) model, to create the three-dimensional object.

The fused layers of powder bed fused objects can be of any thickness suitable for selective laser sintered processing. The individual layers can be each, on average, preferably at least 50 micrometers (μm) thick, more preferably at least 80 μm thick, and even more preferably at least 100 μm thick. In a preferred embodiment, the plurality of sintered layers are each, on average, preferably less than 500 μm thick, more preferably less than 300 μm thick, and even more preferably less than 200 μm thick. Thus, the individual layers for some embodiments can be 50 to 500 μm, 80 to 300 μm, or 100 to 200 μm thick. Three-dimensional objects produced from powder compositions of the present technology using a layer-by-layer powder bed fusing processes other than selective laser sintering can have layer thicknesses that are the same or different from those described above.

"Polycarbonate" as used herein means a polymer or copolymer having repeating structural carbonate units of formula (1):

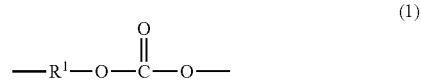

wherein at least 60 percent of the total number of R1 groups are aromatic, or each R1 contains at least one C6-30 aromatic group. Specifically, each R1 can be derived from a dihydroxy compound such as an aromatic dihydroxy compound of formula (2) or a bisphenol of formula (3), as follows:

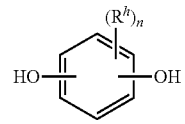

(2)

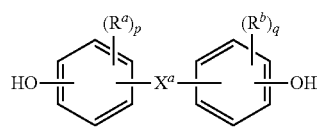

(3)

In formula (2), each Rh is independently a halogen atom, for example bromine, a C1-10 hydrocarbyl group such as a C1-10 alkyl, a halogen-substituted C1-10 alkyl, a C6-10 aryl, or a halogen-substituted C6-10 aryl, and n is 0 to 4.

In formula (3), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In certain embodiments, p and q are each 0, or p and q are each 1, and $R^a$ and $R^b$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$— (e.g., bisphenol-S polycarbonate, polysulfone), —C(O)— (e.g., polyketone), or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_7$-12 arylalkyl, $C_{1}$-12 heteroalkyl, or cyclic $C_7$-12 heteroarylalkyl; or a group of the formula C(=$R^e$)— wherein $R^e$ is a divalent $C_{1-12}$ hydrocarbon group. Certain illustrative examples of dihydroxy compounds that can be used are described, for example, in WO 2013/175448 A1, US 2014/0295363, and WO 2014/072923.

Specific dihydroxy compounds include resorcinol, 2,2-bis (4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol).

"Polycarbonate" as used herein also includes copolymers comprising carbonate units and ester units ("poly(ester-carbonate)s", also known as polyester-polycarbonates). Poly (ester-carbonate)s further contain, in addition to recurring carbonate chain units of formula (1), repeating ester units of formula (4):

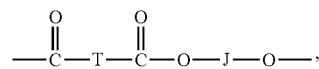

(4)

wherein J is a divalent group derived from a dihydroxy compound (which includes a reactive derivative thereof), and can be, for example, a $C_{2-10}$ alkylene, a $C_6$-20 cycloalkylene a $C_6$-20 arylene, or a polyoxyalkylene group in which the alkylene groups contain 2 to 6 carbon atoms, specifically, 2, 3, or 4 carbon atoms; and T is a divalent group derived from a dicarboxylic acid (which includes a reactive derivative thereof), and can be, for example, a $C_2$-20 alkylene, a $C_6$-20 cycloalkylene, or a $C_{6-20}$ arylene. Copolyesters containing a combination of different T or J groups can be used. The polyester units can be branched or linear.

Specific dihydroxy compounds include aromatic dihydroxy compounds of formula (2) (e.g., resorcinol), bisphenols of formula (3) (e.g., bisphenol A), a $C_{1-8}$ aliphatic diol such as ethane diol, n-propane diol, i-propane diol, 1,4-butane diol, 1,6-cyclohexane diol, 1,6-hydroxymethylcyclohexane, or a combination comprising at least one of the foregoing dihydroxy compounds. Aliphatic dicarboxylic acids that can be used include $C_{6-20}$ aliphatic dicarboxylic acids (which includes the terminal carboxyl groups), specifically linear $C_{8-12}$ aliphatic dicarboxylic acid such as decanedioic acid (sebacic acid); and alpha, omega-$C_a$ dicarboxylic acids such as dodecanedioic acid (DDDA). Aromatic dicarboxylic acids that can be used include terephthalic acid, isophthalic acid, naphthalene dicarboxylic acid, 1,6-cyclohexane dicarboxylic acid, or a combination comprising at least one of the foregoing acids. A combination of isophthalic acid and terephthalic acid wherein the weight ratio of isophthalic acid to terephthalic acid is 91:9 to 2:98 can be used.

Specific ester units include ethylene terephthalate units, n-propylene terephthalate units, n-butylene terephthalate units, ester units derived from isophthalic acid, terephthalic acid, and resorcinol (ITR ester units), and ester units derived from sebacic acid and bisphenol A. The molar ratio of ester units to carbonate units in the poly(ester-carbonate)s can vary broadly, for example 1:99 to 99:1, specifically, 10:90 to 90:10, more specifically, 25:75 to 75:25, or from 2:98 to 15:85.

The polycarbonates can have an intrinsic viscosity, as determined in chloroform at 25° C., of 0.3 to 1.5 deciliters per gram (dl/gm), specifically 0.45 to 1.0 dl/gm. The polycarbonates can have a weight average molecular weight of 5,000 to 200,000 Daltons, specifically 15,000 to 100,000 Daltons, as measured by gel permeation chromatography (GPC), using a crosslinked styrene-divinylbenzene column and calibrated to polycarbonate references. GPC samples are prepared at a concentration of 1 mg per ml (mg/ml), and are eluted at a flow rate of 1.5 ml per minute.

In certain embodiments, the method of preparing a partially crystalline polycarbonate powder comprises dissolving an amorphous polycarbonate in a polar aprotic solvent such as dimethyl sulfoxide (DMSO) at a temperature above room temperature. Room temperature is understood to be about 20° C. (68° F.); as such, the amorphous polycarbonate can be dissolved in DMSO at a temperature above about 20° C. The amorphous polycarbonate is soluble in the DMSO solvent and thus a polycarbonate solution is formed. In general, the solution can be prepared at a temperature above room temperature so that the amount of dissolved amorphous polycarbonate can be considered supersaturated at room temperature. Mixing of amorphous polycarbonate into DMSO solvent can be carried out in-line or batch. The process can readily be carried out at manufacturing scale. Upon cooling to room temperature (e.g., about 20° C.), the dissolved amorphous polycarbonate begins to crystallize and precipitate out of the DMSO solvent resulting in the precipitation of a partially crystalline polycarbonate precipitate. It is further possible that when the precipitation occurs under high shear mixing conditions, the formation of an increased percentage of crystalline polycarbonate particles occurs while simultaneously preventing formation of firmly agglomerated polycarbonate particles. It has been found, for example, that agglomerates can be readily broken by crushing, high speed mixing, or other low- or medium-force shearing processes.

Following precipitation, the DMSO solvent is removed and the partially crystalline polymer powder can be dried by heat with or without vacuum. The resulting crystalline polycarbonate powder can have a higher percentage of particles having a particle size of less than 150 micrometers, as well as a relatively narrow particle size distribution. The recovered DMSO solvent can be reused to begin the process anew by dissolving additional amorphous polycarbonate. This is unlike other methods that use one or more solvents that are mixed with non-solvents to precipitate crystalline polycarbonate powder. Such mixtures of solvents and non-solvents cannot be readily reused.

As provided herein, amorphous polycarbonate is dissolved in DMSO solvent. For example, the amorphous polycarbonate can be dissolved in DMSO under conditions that result in a supersaturated solution of polycarbonate, where changing conditions (e.g., changing temperature of the solution) result in precipitation of partially crystalline polycarbonate powder therefrom. In certain embodiments, the solvent can include DMSO as well as one or more other polar aprotic solvents. In certain embodiments, the solvent can consist essentially of DMSO, where no other components are present that materially affect the crystallization of polycarbonate; e.g., no non-solvents are present, as described by U.S. Pub. No. 2018/0244863. In certain embodiments, the solvent can consist of DMSO, where there are substantially no other solvents present based upon the purity levels attainable in the art with respect to DMSO. That is, the solvent can be substantially 100% DMSO. It is further noted that upon precipitating partially crystalline polycarbonate powder from a solution of amorphous polycarbonate and DMSO, a portion of the solubilized amorphous polycarbonate can remain in solution. Separation of the precipitated partially crystalline polycarbonate powder from the remainder of the solution therefore leaves a solution of DMSO with a portion of solubilized amorphous polycarbonate that can be reused to again dissolve more amorphous polycarbonate. In the repeat use of the DMSO (including the already dissolved portion of amorphous polycarbonate), less amorphous polycarbonate may need to be added to achieve a supersaturated state, for example, where changing from the first temperature to the lower second temperature results in another precipitation of partially crystalline polycarbonate powder.

In certain embodiments, the partially crystalline polycarbonate powder has a D85 particle size of less than 150 micrometers, specifically, a D90 particle size of less than 150 micrometers. In certain embodiments, the partially crystalline polycarbonate powder has a D93 particle size of less than 150 micrometers, in which 93% of the partially crystalline polycarbonate powder has a particle size of less than 150 µm. Certain embodiments include where the partially crystalline polycarbonate powder has a D90 particle size of less than 150 µm. A partially crystalline polycarbonate powder in which 100% of the particles have a size of less than 150 micrometers can also be produced by this method.

The partially crystalline polycarbonate powder can also have an average particle diameter of less than or equal to 100 µm. Specifically, the partially crystalline polycarbonate powder can have an average particle diameter of 10 µm to 100 µm. The average particle diameter of the partially crystalline polycarbonate powder can also be less than or equal to 100 µm, or include an average particle diameter of between 0 to 100 µm.

In certain embodiments, the partially crystalline polycarbonate powder has a percent crystallinity of at least 20%, for example 20% to 80%, specifically, at least 25%, for example 25% to 60%, more specifically at least 27%, for example 27% to 40%. The partially crystalline polycarbonate powder can also have 25% to 30% crystallinity. Embodiments further include 25% to 35% crystallinity.

In certain embodiments, a method of preparing an article comprises providing a powder composition comprising the partially crystalline polycarbonate powder, and using a powder bed fusing process with the powder composition to form a three-dimensional object. The at least one partially crystalline polycarbonate powder can have a D50 particle size of less than 150 micrometers in diameter and is made by above-described methods. Embodiments include where the partially crystalline polycarbonate powder has a D90 particle size of less than 150 µm, an average particle diameter of less than or equal to 100 µm, or an average particle diameter of between 0 to 100 µm, and at least 20% crystallinity, or at least 25% crystallinity, or 25 to 35% crystallinity. The partially crystalline polycarbonate powder can be made as described herein by converting an amorphous polycarbonate to the crystalline polycarbonate powder. The conversion of the amorphous polycarbonate includes dissolving the amorphous polycarbonate in DMSO solvent to form a solution above room temperature, cooling the solution to room temperature to form a precipitate including partially crystalline polycarbonate powder, removing the solvent from the precipitate, drying the precipitate, and recovering the crystalline polycarbonate powder.

The partially crystalline polycarbonate powder can be used as the sole component in the powder composition and applied directly in a powder bed fusing step. Alternatively, the partially crystalline polycarbonate powder can first be mixed with other polymer powders, for example, another crystalline polymer or an amorphous polymer, or a combination of a partially crystalline polymer and an amorphous polymer. The powder composition used in the powder bed fusing can include between 50 wt % to 100 wt % of the partially crystalline polycarbonate powder, based on the total weight of all polymeric materials in the powder composition.

The partially crystalline polycarbonate powder can also be combined with one or more additives/components to make a powder useful for powder bed fusing methods. Such optional components can be present in a sufficient amount to perform a particular function without adversely affecting the powder composition performance in powder bed fusing or the object prepared therefrom. Optional components can have an average particle diameter which falls within the range of the average particle diameters of the partially crystalline polycarbonate powder or an optional flow agent. If necessary, each optional component can be milled to a desired particle size and/or particle size distribution, which can be substantially similar to the partially crystalline polycarbonate powder. Optional components can be particulate materials and include organic and inorganic materials such as fillers, flow agents, and coloring agents. Still other additional optional components can also include, for example, toners, extenders, fillers, colorants (e.g., pigments and dyes), lubricants, anticorrosion agents, thixotropic agents, dispersing agents, antioxidants, adhesion promoters, light stabilizers, organic solvents, surfactants, flame retardants, anti-static agents, plasticizers a combination comprising at least one of the foregoing. Yet another optional component also can be a second polymer that modifies the properties of the partially crystalline polycarbonate. In certain embodiments, each optional component, if present at all, can be present in the powder composition in an amount of 0.01 wt % to 30 wt %, based on the total weight of the powder composition. The total amount of all optional components in the powder composition can range from 0 up to 30 wt % based on the total weight of the powder composition.

It is not necessary for each optional component to melt during the powder bed fusing process; e.g., a laser sintering process. However, each optional component can be selected to be compatible with the partially crystalline polycarbonate polymer in order to form a strong and durable object. The optional component, for example, can be a reinforcing agent that imparts additional strength to the formed object. Examples of the reinforcing agents include one or more types of glass fibers, carbon fibers, talc, clay, wollastonite, glass beads, and combinations thereof.

The powder composition can optionally contain a flow agent. In particular, the powder composition can include a particulate flow agent in an amount of 0.01 wt % to 5 wt %, specifically, 0.05 wt % to 1 wt %, based on the total weight of the powder composition. In certain embodiments, the powder composition comprises the particulate flow agent in an amount of 0.1 wt % to 0.25 wt %, based on the total weight of the powder composition. The flow agent included in the powder composition can be a particulate inorganic material having a median particle size of 10 μm or less, and can be chosen from a group consisting of hydrated silica, amorphous alumina, glassy silica, glassy phosphate, glassy borate, glassy oxide, titania, talc, mica, fumed silica, kaolin, attapulgite, calcium silicate, alumina, magnesium silicate, and combinations thereof. The flow agent can be present in an amount sufficient to allow the partially crystalline polycarbonate polymer to flow and level on the build surface of the powder bed fusing apparatus (e.g., a laser sintering device). In certain embodiments the flow agent includes fumed silica.

Another optional component is a coloring agent, for example a pigment or a dye, like carbon black, to impart a desired color to the object. The coloring agent is not limited, as long as the coloring agent does not adversely affect the composition or an object prepared therefrom, and where the coloring agent is sufficiently stable to retain its color under conditions of the powder bed fusing process and exposure to heat and/or electromagnetic radiation; e.g., a laser used in a sintering process.

Still further additives include, for example, toners, extenders, fillers, colorants (e.g., pigments and dyes), lubricants, anticorrosion agents, thixotropic agents, dispersing agents, antioxidants, adhesion promoters, light stabilizers, organic solvents, surfactants, flame retardants, anti-static agents, plasticizers, and combinations of such.

Still another optional component also can be a second polymer that modifies the properties of the partially crystalline polycarbonate powder.

The powder composition is a fusible powder composition and can be used in a powder bed fusing process such as selective laser sintering. An example of a selective laser sintering system for fabricating a part from a fusible powder composition, and in particular for fabricating the part from the fusible crystalline polycarbonate powder disclosed herein, can be described as follows. One thin layer of powder composition comprising the partially crystalline polycarbonate powder is spread over the sintering chamber. The laser beam traces the computer-controlled pattern, corresponding to the cross-section slice of the CAD model, to melt the powder selectively which has been preheated to slightly below its melting temperature. After one layer of powder is sintered, the powder bed piston is lowered with a predetermined increment (typically 100 μm), and another layer of powder is spread over the previous sintered layer by a roller. The process then repeats as the laser melts and fuses each successive layer to the previous layer until the entire object is completed. Three-dimensional objects comprising a plurality of fused layers can thus be made using the partially crystalline polycarbonate powder described herein.

The present technology provides certain benefits and advantages. One advantage is the use of a single solvent in preparing the partially crystalline polycarbonate powder, which facilitates solvent recovery and reuse thereof. Another advantage is that amorphous polycarbonate can be transformed into a polycarbonate powder having optimized crystallinity and optimized particle size distribution. Yet another advantage is that the partially crystalline polycarbonate powder provides improved powder bed fusion performance. Additive manufacturing processes that employ fusion of a powder bed, including selective laser sintering (SLS), multi jet fusion (MJF), high speed sintering (HSS), and electrophotographic 3D-printing, can therefore benefit by forming and using partially crystalline polycarbonate powder produced as described herein.

The following Examples further illustrate the above concepts.

Example 1

An illustrative embodiment of the process for making pulverulent polycarbonate suitable for additive manufacturing is as follows. To a 5-L four-neck round-bottom flask fitted with an overhead stirrer was added 1 kg polycarbonate (Lupoy 1303EP-22, MW=ca. 38,000 Da) and 3 L DMSO (99.7%, Acros Organics). The solvent was sparged and the flask flushed with a nitrogen atmosphere for 20 minutes. The mixture was heated with an electric mantle to 160° C. with stirring at a rate of 200 rpm to yield a solution of polycarbonate in DMSO. The mantle was removed to allow the reactor temperature to cool at a rate of 1° C./min while continuing to stir at 200 rpm. The polycarbonate precipitated between about 70° C. and about 80° C. The thick slurry was removed from the reactor and poured into a 50 μm nylon mesh bag nested inside of a 100 μm nylon mesh bag of equivalent dimensions. The DMSO was separated by squeezing the bags. The residual powder was washed 3×4 L of water: the first for 30 min., the second for 15 hrs., and the third for 4 hrs. The powder slurry was filtered and dried at 120° C. for 16 hrs., followed by sieving sequentially through 250 μm and 180 μm sieves.

Density and Flowability. Average bulk density of pulverulent polycarbonate prepared in this embodiment was 0.42 g/cm³. Average tap density was 0.52 g/cm³ (average Hausner ratio=1.26, Carr's index 0.20). Flowability was determined using a cone with a 10 mm nozzle diameter, and has an average value of 2.58 g/sec.

Particle size, shape and distribution (PSSD). PSSD was determined in water using a Microtrac 53500 instrument. $D_{90}=67.8$ µm; $D_{50}=37.7$ µm; $D_{10}=16.8$ µm. Sphericity data is as shown in Table 1.

TABLE 1

| | |
|---|---|
| >0.65 | 97.03% |
| >0.75 | 89.64% |
| >0.85 | 64.43% |
| >0.90 | 28.70% |
| >0.95 | 7.01% |

Molecular weight. GPC samples were prepared at a concentration of 2 mg/mL tetrahydrofuran (THF), and are eluted at a flow rate of 1 mL/min. on a Waters GPC instrument with a Styragel HR4 5-µm 7.8×300 mm (THF) Column and a 2414 Refractive Index Detector. The peak molecular weight ($M_P$) of the raw polycarbonate=38093 Da; $M_P$ of pulverulent polycarbonate=29900 Da.

Scanning Electron Micrography (SEM). SEM images reveal spheroidal, partially agglomerated particles of a typical size in agreement with PSSD results.

Figure 3:
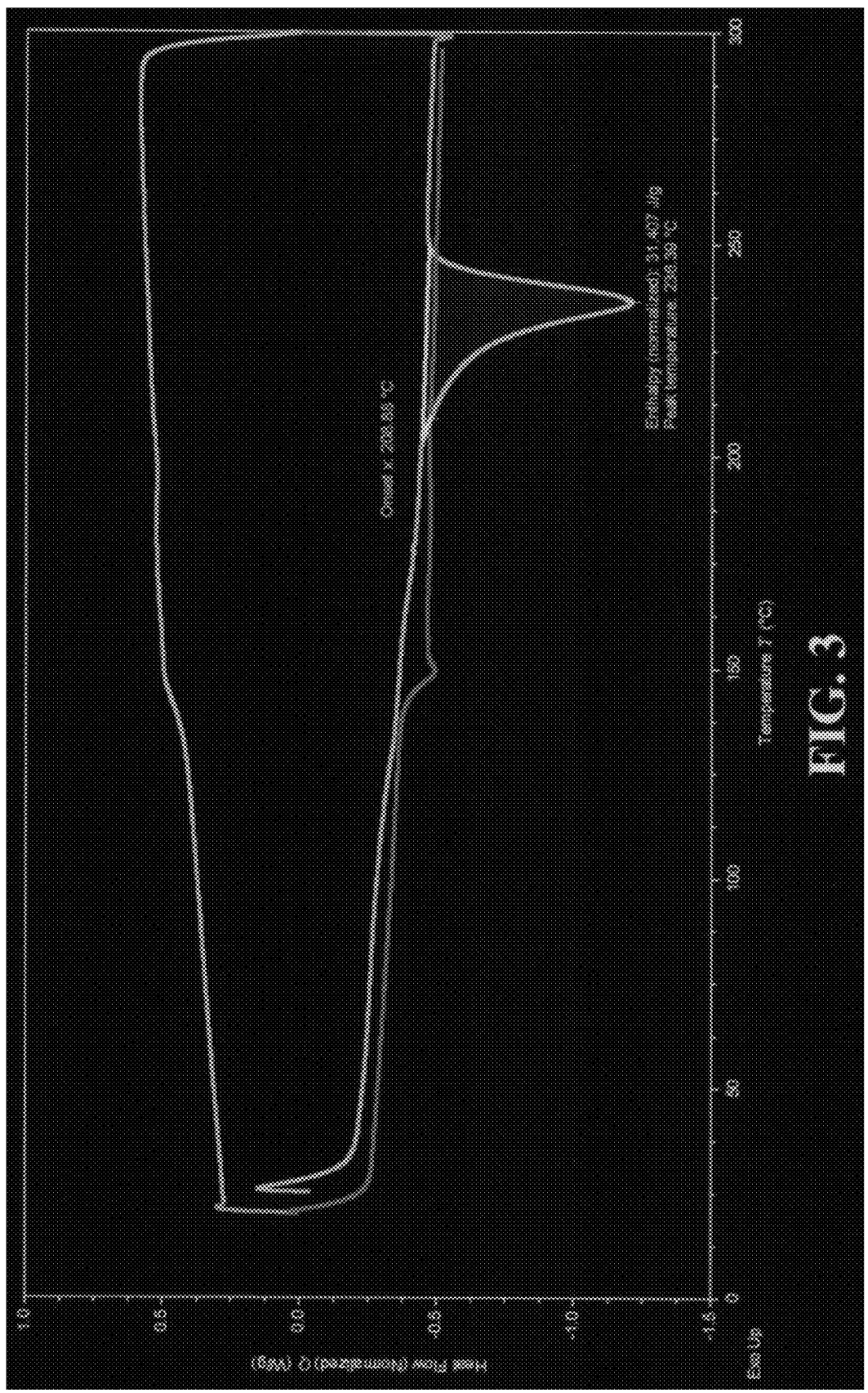
FIG. 3: Differential scanning calorimetry (DSC) of pulverulent polycarbonate as produced by Example 1.
Figure 4:
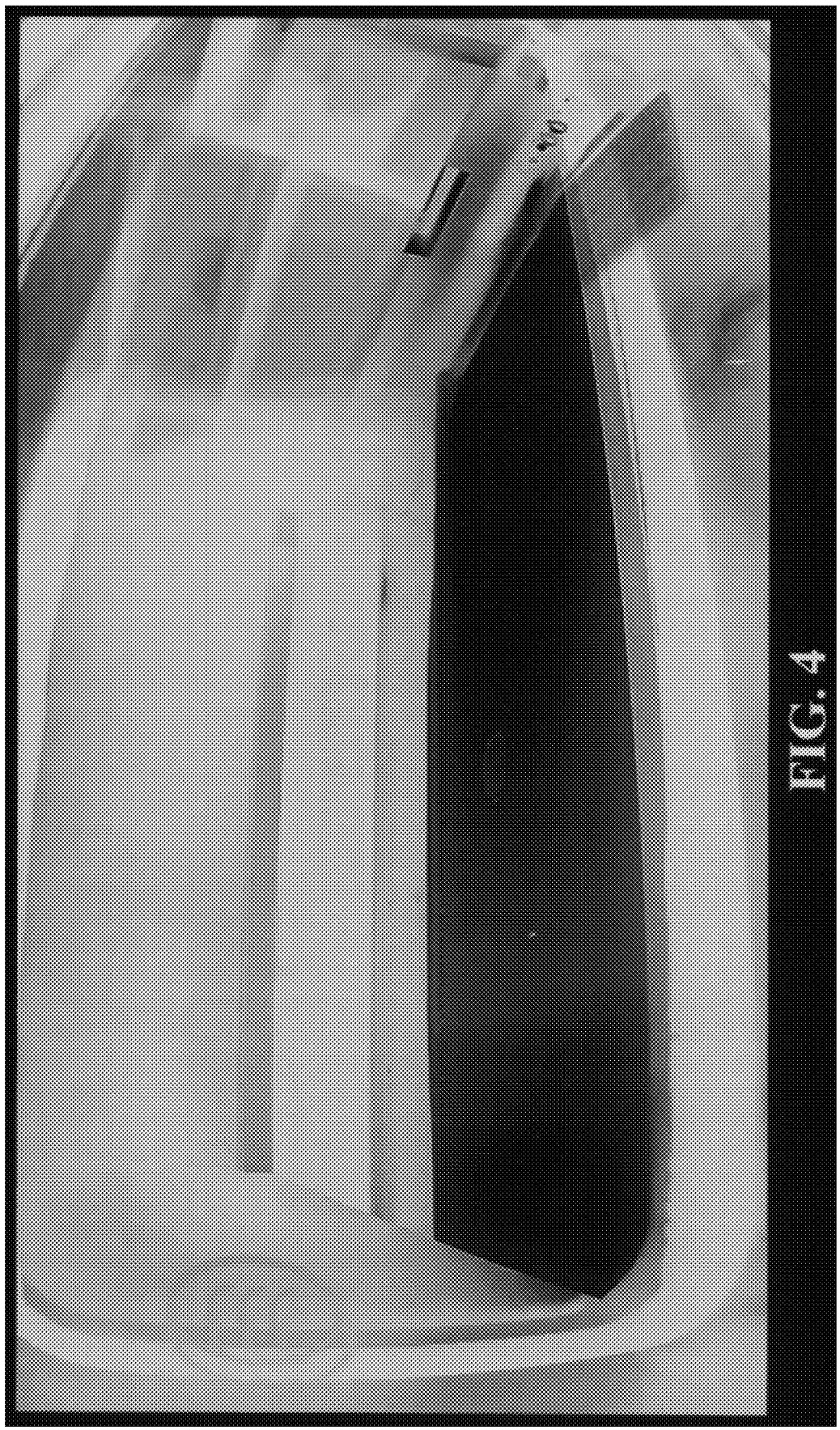
FIG. 4: Selective laser sintering (SLS) process to produce sample coupon from pulverulent polycarbonate as described in Example 1.
Figure 5:
FIG. 5: Selective laser sintering (SLS) process to produce sample tensile bars from pulverulent polycarbonate as described in Example 3.
Figure 6:
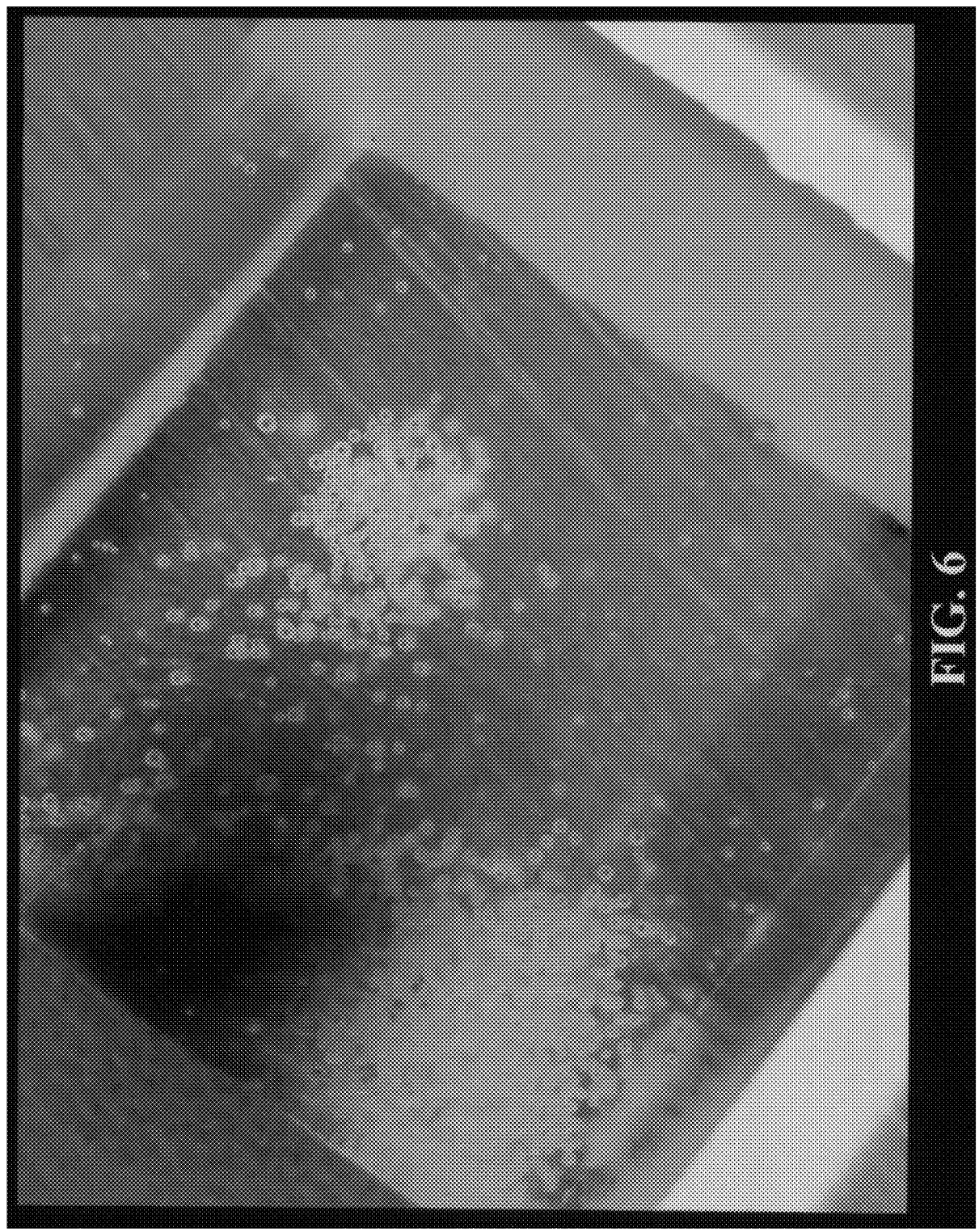
FIG. 6: Selective laser sintered (SLS) 1 in. cube printed from pulverulent polycarbonate as described in Example 3. Sides were polished to remove exterior powder coating and expose the interior of the part.

Differential Scanning calorimetry (DSC) and Crystallinity. The DSC was performed on a TA Instruments DSC 250 instrument scanning at 20° C./min. and is shown in FIG. 3. Onset of melting occurred at 208.88° C., and peaked at 236.39° C. Upon cooling, a glass transition appeared at 142° C., and again upon secondary heating at 147° C., after which no melting behavior was observed.

The percent crystallinity of semi-crystalline pulverulent polycarbonate was estimated by measuring the enthalpy of fusion in the melting peak (31.407 J/g) and comparing it with the reference value for the enthalpy of fusion for 100% crystalline polycarbonate, reported as 134 J/g in the literature (K. Varadarajan, et al., *J. Polym. Sci. Polym. Phys.* 1982, 20(1), 141-154). The estimated crystallinity of semi-crystalline polycarbonate was therefore 23.4%.

SLS Printing of Pulverulent Polycarbonate. The pulverulent polycarbonate was utilized in the laser sintering process on a Farsoon ST252P laser sintering system. Three kilograms of material was loaded into the feed piston of the machine and settled into the piston achieving the optimal tapped density using a cement vibrator. Under an inert nitrogen atmosphere, material was moved from the feed piston to the part piston in a layerwise fashion using a counter-rotating roller at layer thicknesses of 0.080 mm. Layers were laid at 90 s intervals in order to allow for sufficient thermal absorption from near-IR heaters, during which time the temperature of the feed piston ramped from 60° C. to 180° C. and the part bed temperature ramped from 60° C. to 207° C. Once the part bed temperature reached the set point of 207° C., part areas were exposed using the scanning system parameters shown in Table 2 in order to melt selected areas into solid parts.

TABLE 2

| | |
|---|---|
| Laser spot size (µm) | 450 |
| Fill scan speed (mm/s) | 10,160 |
| Fill scan spacing (mm) | 0.28 |
| Fill laser power (W) | 30 |

Parts produced included thin discs, crosses, "window" test coupons, and ASTM D638 Type IV tensile bars. Parts featured a slight yellow tint, but were mostly translucent and lacked the opaque appearance of typical laser sintering materials.

Example 2

An illustrative embodiment of the process for making pulverulent polycarbonate suitable for additive manufacturing is as follows. To a 20-L Reactor fitted with an overhead stirrer was added 4.0 kg polycarbonate (Lexan 121R 112) and 15.73 L DMSO (99.7%, Acros Organics). The solvent was sparged and the flask flushed with an argon atmosphere for 4 hours. The mixture was heated with an oil jacket to 160° C. with stirring at a rate of 180 rpm to yield a solution of polycarbonate in DMSO. The reactor was allowed cool at a rate of 0.1-0.2° C./min while continuing to stir at 180 rpm. The polycarbonate precipitated between about 70° C. and about 80° C. The thick slurry was removed from the reactor and poured into a 50 µm nylon mesh bag nested inside of a 100 µm nylon mesh bag of equivalent dimensions. The DMSO was separated by squeezing the bags. The residual powder was soaked in 1×30 L of water for 3 days. This was removed by using the aforementioned bags. The residual powder was soaked in 1×10 L of Methanol for 2 hours and separated using 5 µm filter paper in a 20 L vacuum filter. The powder was dried at 120° C. for 33 hrs., followed by sieving sequentially through 250 µm and 180 µm sieves.

Particle size and distribution (PSD). PSD was determined in air using a Microtrac S3500 instrument. $D_{90}=22.48$ µm; $D_{50}=14.96$ µm; $D_{10}=10.93$ µm. Sphericity data is as follows:

Differential Scanning calorimetry (DSC) and Crystallinity. The DSC was performed on a TA Instruments DSC 250 instrument scanning at 20° C./min. and is shown in FIG. 3. Onset of melting occurred at 207.56° C., and peaked at 241.28° C.

The percent crystallinity of semi-crystalline pulverulent polycarbonate was estimated by measuring the enthalpy of fusion in the melting peak (31.377 J/g) and comparing it with the reference value for the enthalpy of fusion for 100% crystalline polycarbonate, reported as 134 J/g in the literature (K. Varadarajan, et al., *J. Polym. Sci. Polym. Phys.* 1982, 20(1), 141-154). The estimated crystallinity of semi-crystalline polycarbonate was therefore 23.4%.

SLS Printing of Pulverulent Polycarbonate. The pulverulent polycarbonate was utilized in the laser sintering process on a Farsoon ST252P laser sintering system. Two and one half kilograms of material was loaded into the feed piston of the machine and settled into the piston achieving the optimal tapped density using a cement vibrator. Under an inert nitrogen atmosphere, material was moved from the feed piston to the part piston in a layerwise fashion using a counter-rotating roller at layer thicknesses of 0.061 mm. Layers were laid at 90 s intervals in order to allow for sufficient thermal absorption from near-IR heaters, during which time the temperature of the feed piston ramped from 60° C. to 180° C. and the part bed temperature ramped from 60° C. to 207° C. Once the part bed temperature reached the set point, it was lowered to 205.5° C. as the part bed started to crack, part areas were exposed using the scanning system parameters in Table 3 in order to melt selected areas into solid parts.

TABLE 3

| | |
|---|---|
| Laser spot size (µm) | 450 |
| Fill scan speed (mm/s) | 10,160 |

TABLE 3-continued

| | |
|---|---|
| Fill scan spacing (mm) | 0.20 |
| Fill laser power (W) | 60 |
| Number of scans | 3 |
| Layer interval (s) | 23 |

Parts produced included thin discs, crosses, "window" test coupons, and ASTM D638 Type IV tensile bars. Parts featured a slight yellow tint, but were mostly translucent and lacked the opaque appearance of typical laser sintering materials.

Example 3

An illustrative embodiment of the process for making pulverulent polycarbonate suitable for additive manufacturing is as follows. To a 20-L Reactor fitted with an overhead stirrer was added 3.21 kg polycarbonate (Lupoy 1080C 70, MW=ca. 30,000 Da) and 13.76 L DMSO (99.7%, Acros Organics) [A second batch consisting of 3.00 kg polycarbonate (Lupoy 1080C 70) and 12.96 L DMSO (99.7%, Acros Organics) was performed alongside this one]. The solvent was sparged and the reactor flushed with an argon atmosphere for 3 hours. The mixture was heated with an oil jacket to 160° C. with stirring at a rate of 180 rpm to yield a solution of polycarbonate in DMSO. The reactor was allowed cool at a rate of 0.1-0.2° C./min while continuing to stir at 180 rpm. The polycarbonate precipitated between about 70° C. and about 80° C. The slurry was removed from the reactor, combined with the second batch, and poured into a 20 L vacuum filter flask with a 4 µm filter paper. 15 L of DMSO was recovered using this method. The residual powder was processed using 140 L of DI water and 20 L of acetone as follows: soaked in 2×15 L of water for 1 day; filtered and soaked with 1×25 L of water for 1 day; filtered, washed with 2×20 L of water, and soaked in 25 L of water for 1 day; filtered, washed with 1×20 L of water and 1×20 L of acetone. The powder was dried at 110° C. for 72 hrs., followed by a 250 µm sieve providing 4.5 kg of powder.

Density and Flowability. Average bulk density of pulverulent polycarbonate prepared in this embodiment was 0.42 g/cm$^3$. Average tap density was 0.48 g/cm$^3$ (average Hausner ratio=1.15, Carr's index 0.12). Flowability was determined using a cone with a 15 mm nozzle diameter, and has an average value of 8.93 g/sec.

Particle size distribution (PSD). PSD was determined in air using a Microtrac S3500 instrument. $D_{90}$=101.5 µm; $D_{50}$=69.56 µm; $D_{10}$=45.69 µm.

Molecular weight. GPC samples were prepared at a concentration of 2 mg/mL tetrahydrofuran (THF), and are eluted at a flow rate of 1 mL/min. on a Waters GPC instrument with a Styragel HR4 5-µm 7.8×300 mm (THF) Column and a 2414 Refractive Index Detector. The peak molecular weight ($M_P$) of the raw polycarbonate=30318 Da.

Scanning Electron Micrography (SEM). SEM images reveal spheroidal, partially agglomerated particles of a typical size in agreement with PSD results.

Differential Scanning calorimetry (DSC) and Crystallinity. The DSC was performed on a TA Instruments DSC 250 instrument scanning at 20° C./min. and is shown in FIG. 3. Onset of melting occurred at 196.67° C., and peaked at 233.97° C. Upon secondary heating, a glass transition occurred at 138.84° C., after which no melting behavior was observed.

The percent crystallinity of semi-crystalline pulverulent polycarbonate was estimated by measuring the enthalpy of fusion in the melting peak (31.407 J/g) and comparing it with the reference value for the enthalpy of fusion for 100% crystalline polycarbonate, reported as 134 J/g in the literature (K. Varadarajan, et al., J. Polym. Sci. Polym. Phys. 1982, 20(1), 141-154). The estimated crystallinity of semi-crystalline polycarbonate was therefore 26.9%.

SLS Printing of Pulverulent Polycarbonate. The pulverulent polycarbonate was utilized in the laser sintering process on a Farsoon ST252P laser sintering system. Four and one half kilograms of material was loaded into the feed piston of the machine and settled into the piston achieving the optimal tapped density using a cement vibrator. Under an inert nitrogen atmosphere, material was moved from the feed piston to the part piston in a layerwise fashion using a counter-rotating roller at layer thicknesses of 0.102 mm. Layers were laid at 90 s intervals in order to allow for sufficient thermal absorption from near-IR heaters, during which time the temperature of the feed piston ramped from 60° C. to 200° C. and the part bed temperature ramped from 60° C. to 219° C. Once the part bed temperature reached the set point of 219° C., part areas were exposed using the scanning system parameters shown in Table 4 in order to melt selected areas into solid parts.

TABLE 4

| | |
|---|---|
| Laser spot size (µm) | 450 |
| Fill scan speed (mm/s) | 10,160 |
| Fill scan spacing (mm) | 0.20 |
| Fill laser power (W) | 35 |
| Number of scans | 2 |
| Layer interval (s) | 30 |

Parts produced included thin discs, large cubes, and ASTM D638 Type IV tensile bars. Parts featured a slight yellow tint, but were mostly translucent and lacked the opaque appearance of typical laser sintering materials.

Example 4

30 g of Lexan 121 polycarbonate was dissolved in 100 ml of acetophenone. The mixture was placed in a 300 ml Erlenmeyer flask and stirred and heated on a magnetic hot plate to 182° C. At this temperature, the polycarbonate was observed to be fully dissolved. The heater was turned off and the solution was allowed to cool while stirring. The solution was visually cloudy when observed at approximately 52° C. The solution was held at ambient conditions (approximately 20° C.) overnight, for approximately 15 hours. 200 ml of acetone was added to thin out the solution before filtering via vacuum filtration. The solids that were separated from the solution were dried by placing them in a ventilated lab hood overnight.

Process

An illustrative process of making pulverulent polycarbonate for additive manufacturing and other applications comprises: adding the polycarbonate to a reactor vessel containing a solvent which may be selected from a group including: dimethyl sulfoxide (DMSO); acyclic and cyclic ketones such as cyclopentanone, cyclohexanone, or acetophenone; acyclic and cyclic secondary amides (e.g., N-methylpyrrolidinone (NMP) or N,N-dimethylformamide (DMF)); acyclic and cyclic esters (γ-butyrolactone); halogenated hydrocarbons (e.g., dichloromethane); anisole; or phenols (e.g., m-cresol); optionally mixing in additive substances (e.g., inorganic oxide(s), organic compounds, carbon microfibers, glass microfibers, and/or secondary polymers) for the purpose(s) of particle nucleation, particle dispersion, IR absorption, mineralization and strengthening, flame retardancy, and/or coloration; applying an inert atmosphere to the vessel. agitating the mixture; raising the temperature in the container; forming a solution of polycarbonate; cooling the solution to a precipitation temperature of the polycarbonate; precipitating the polycarbonate in powder form from the solution; removing the polycarbonate powder slurry from the reactor; separating the polycarbonate from the solvent by filtration; washing the polycarbonate powder with a quantity of wash solvent (e.g., water and/or a volatile organic solvent such as alcohol, ketone, ether, ester or hydrocarbon in which polycarbonate does not significantly dissolve) to remove the reprecipitation solvent; and drying the polycarbonate by heating above 150° C., preferably above 175° C., and most preferably above 195° C. but not above 205° C., and preferably under reduced pressure.

It is believed that the presence of a polar solvent exhibiting effective intermolecular interactions with the polar functional groups in the polycarbonate chains facilitates organization of the polymer chains into crystalline domains in the precipitation process.

A variety of methods to chemically precipitate the above-identified polymers may be employed. One skilled in the art will appreciate, based on illustrative methods described below, that other precipitation methods may be employed in the embodiments though they are not explicitly disclosed herein.

Another illustrative method of making the powder from polycarbonate may include evaporation limited coalescence and anti-solvent precipitation.

The term "agitating the mixture" refers to methods of stirring the components in a liquid or slurried mixture under conditions in which shear forces are generated, creating patterns of flow and turbulence, generally using an impellor that rotates inside a stator. Once the impellor has drawn mixture in, it subjects the mixture to sudden changes of direction and acceleration such that the mixture contacts the wall of the stator with centrifugal force, or is forced through the holes in the stator under pressure and speed, in a final disintegrating change of direction and acceleration. In exemplary embodiments of high shear mixing conditions, mixing comprises operating at speeds of 50 rotations per minute (rpm) to 500 rpm. Agitation can be achieved with any commercially available mixers; for example, a mixer such as a Hei-Torque 200 reactor stirring motor can be used.

It is appreciated that the rotation rate of the stirrer, precipitation temperature, and time can be modified to potentially affect the particle size of the resulting polycarbonate powder. It is also appreciated that the powder may be reprecipitated.

It is further appreciated that the polycarbonate may also be mixed in different ratios and particle sizes. This may have the effect of changing or controlling the properties of the resulting pulverulent polycarbonate. It is further contemplated that the polycarbonate may be developed in powdered form through other methods of chemical precipitation.

Melting point and enthalpy may be determined using differential scanning calorimetry (DSC); for example, a TA Instruments Discovery Series DSC 250.

Powder flow may be measured using Method A of ASTM D 1895.

Young's modulus of elasticity and tensile strength maybe determined pursuant to the ASTM D 790 standard.

Scanning electron microscopy was performed using a JEOL instrument operating in low vacuum secondary electron detection (LVSED) mode.

The process for modifying the produced pulverulent polycarbonate material for additive manufacturing may comprise: adding at least one compatible filler to the polycarbonate, wherein the fillers are either organic or inorganic; at least one filler being selected from the group consisting of glass, metal, or ceramic particles, pigments, titanium dioxide particles, and carbon black particles; particle size of at least one filler being about equal to or less than particle sizes of the polycarbonate; the particle sizes of at least one filler does not vary more than about 15-20 percent of an average particle size of the polycarbonate; at least one filler is less than about 3% by weight of the polycarbonate; a flow agent being incorporated into the powdered polycarbonate; the flow agent being selected from at least one of a fumed silicas, calcium silicates, alumina, amorphous alumina, magnesium silicates, glassy silicas, hydrated silicas, kaolin, attapulgite, glassy phosphates, glassy borates, glassy oxides, titania, talc, pigments, and mica; the flow agent having a particle size of about 10 microns or less; the flow agent does not significantly alter the glass transition temperature of the polycarbonate; the flow agent is present in an amount less than about 5% by weight of polycarbonate.

Disclosed herein also are methods for powder bed fusing a powder composition, including the partially crystalline polycarbonate powder, to form a three-dimensional article. The spheroidal shape of the polymer powder particles results in good flowability of the partially crystalline polycarbonate powder, and thus a smooth and dense powder bed can be formed allowing for optimum precision and density of the sintered part. Also, the partially crystalline nature of the polymeric material allows for ease of processing.

"Powder bed fusing" or "powder bed fusion" includes all laser sintering and all selective laser sintering processes as well as other powder bed fusing technologies as defined by ASTM F2792-12a. For example, sintering of the powder composition can be accomplished via application of electromagnetic radiation other than that produced by a laser, with the selectivity of the sintering achieved, for example, through selective application of inhibitors, absorbers, susceptors, or the electromagnetic radiation (e.g., through use of masks or directed laser beams). Any other suitable source of electromagnetic radiation can be used, including, for example, infrared radiation sources, microwave generators, lasers, radiative heaters, lamps, or a combination thereof.

Also included herein are all three-dimensional products made by powder bed fusing these powder compositions. After a layer-by-layer manufacture of an article of manufacture, the article can exhibit excellent resolution, durability, and strength. These articles of manufacture can have a wide variety of uses, including as prototypes and as end products as well as molds for end products.

In some embodiments of the methods, a plurality of layers is formed in a preset pattern by an additive manufacturing process. "Plurality", as used in the context of additive manufacturing, includes five or more layers, or twenty or more layers. The maximum number of layers can vary greatly, determined, for example, by considerations such as the size of the article being manufactured, the technique used, the capabilities of the equipment used, and the level of detail desired in the final article.

As used herein, "layer" is a term of convenience that includes any shape, regular or irregular, having at least a predetermined thickness. In some embodiments, the size and configuration of two dimensions are predetermined, and on some embodiments, the size and shape of all three-dimensions of the layer is predetermined. The thickness of each layer can vary widely depending on the additive manufacturing method. In some embodiments, the thickness of each layer as formed differs from a previous or subsequent layer. In some embodiments, the thickness of each layer is the same. In some embodiments the thickness of each layer as formed is 0.05 millimeters (mm) to 5 mm.

The preset pattern can be determined from a 3D digital representation of the desired article as is known in the art and described in further detail below.

The fused layers of powder bed fused articles can be of any thickness suitable for selective laser sintered processing. The individual layers can be each, on average, preferably at least 100 µm thick, more prefer ably at least 80 µm thick, and even more preferably at least 50 µm thick. In a preferred embodiment, the plurality of sintered layers are each, on average, preferably less than 500 µm thick, more preferably less than 300 µm thick, and even more preferably less than 200 µm thick. Thus, the layers for some embodiments can be 50 to 500 µm, 80 to 300 µm, or 100 to 200 µm thick. Three-dimensional articles produced from powder compositions of the invention using a layer-by-layer powder bed fusing processes other than selective laser sintering can have layer thicknesses that are the same or different from those described above.

Powder-based 3D-printing includes a part bed and feed mechanism. This part bed is generally at a steady temperature before it is subjected to an energy source. That energy source is raised until a fusion temperature is reached. The pulverulent polycarbonate may be placed in a feeder at a start temperature. During operation additional polycarbonate is placed on top of the original polycarbonate which cools and needs to be raised again. It is believed that only the portion of polycarbonate that is directly subjected to energy will be melted and not the surrounding polycarbonate.

For purposes of this disclosure, an "operating window" is defined by the typical range between the melting and the recrystallization (or glass transition) temperatures. Semi-crystalline polycarbonates possess a definitive melting point, allowing for the establishment of an operating temperature near the melting point of the polycarbonate in SLS, MJF, HSS, and possibly electrophotography 3D-printing applications. This well-defined melting behavior allows for an operating window that keeps the rest of the material unmelted, such as even in the presence of a laser or IR heater used during 3D-printing in solid form. The unmelted solid material can then act as a supporting structure for the molten polycarbonate.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A method of preparing a partially crystalline polycarbonate powder, the method comprising:
dissolving an amorphous polycarbonate in a polar aprotic solvent to form a first solution of solubilized polycarbonate at a first temperature; and
cooling the first solution to a second temperature, the second temperature being lower than the first temperature, wherein a portion of the solubilized polycarbonate precipitates from the first solution to form a second solution comprised of precipitated partially crystalline polycarbonate powder and a dissolved remaining portion of polycarbonate in the solvent, wherein the dissolving step includes heating the amorphous polycarbonate in the polar aprotic solvent to form the first solution of solubilized polycarbonate at the first temperature, the first temperature being greater than room temperature.

2. The method of claim 1, further comprising separating the precipitated partially crystalline polycarbonate powder from the second solution leaving a remaining second solution comprised of the aprotic solvent and dissolved remaining portion of polycarbonate in the solvent.

3. The method of claim 2, further comprising drying the separated partially crystalline polycarbonate powder.

4. The method of claim 2, further comprising repeating the dissolving step using the remaining second solution as the polar aprotic solvent and repeating the cooling step to form the second solution including another partially crystalline polycarbonate powder.

5. The method of claim 1, wherein the polar aprotic solvent includes dimethyl sulfoxide.

6. The method of claim 1, wherein the polar aprotic solvent consists essentially of dimethyl sulfoxide.

7. The method of claim 1, wherein the cooling step includes cooling the first solution to the second temperature, the second temperature being room temperature.

8. The method of claim 1, wherein the first solution is supersaturated with amorphous polycarbonate at the first temperature.

9. The method of claim 1, wherein the partially crystalline polycarbonate powder has a D90 particle size of less than about 150 micrometers.

10. The method of claim 1, wherein the partially crystalline polycarbonate powder has an average particle diameter from about 1 micrometer to about 100 micrometers.

11. The method of claim 1, wherein the partially crystalline polycarbonate powder has an average particle diameter from about 30 micrometers to about 40 micrometers.

12. The method of claim 1, wherein the partially crystalline polycarbonate powder is in the form of spheroidal particles.

13. The method of claim 1, wherein the partially crystalline polycarbonate powder has at least about 20% crystallinity.

14. The method of claim 1, wherein the partially crystalline polycarbonate powder has a crystallinity between about 25% and about 35%.

15. A method of preparing an object comprising:
preparing a partially crystalline polycarbonate powder according to the method of claim 1; and
using the partially crystalline polycarbonate powder in a powder bed fusion process to form the object.

16. A method of preparing a partially crystalline polycarbonate powder, the method comprising:
dissolving an amorphous polycarbonate in a polar aprotic solvent to form a first solution of solubilized polycarbonate at a first temperature; and
cooling the first solution to a second temperature, the second temperature being lower than the first temperature, wherein a portion of the solubilized polycarbonate precipitates from the first solution to form a second solution comprised of precipitated partially crystalline polycarbonate powder and a dissolved remaining portion of polycarbonate in the solvent, wherein the partially crystalline polycarbonate powder has a D90 particle size of less than about 150 micrometers.

17. A method of preparing a partially crystalline polycarbonate powder, the method comprising:
dissolving an amorphous polycarbonate in a polar aprotic solvent to form a first solution of solubilized polycarbonate at a first temperature; and
cooling the first solution to a second temperature, the second temperature being lower than the first temperature, wherein a portion of the solubilized polycarbonate precipitates from the first solution to form a second solution comprised of precipitated partially crystalline polycarbonate powder and a dissolved remaining portion of polycarbonate in the solvent, wherein the partially crystalline polycarbonate powder has at least about 20% crystallinity.

18. A method of preparing an object comprising:
preparing a partially crystalline polycarbonate powder according to the method of claim 16; and
using the partially crystalline polycarbonate powder in a powder bed fusion process to form the object.

19. A method of preparing an object comprising:
preparing a partially crystalline polycarbonate powder according to the method of claim 17; and
using the partially crystalline polycarbonate powder in a powder bed fusion process to form the object.

* * * * *